US008052319B2

(12) United States Patent
Lee et al.

(10) Patent No.: US 8,052,319 B2
(45) Date of Patent: Nov. 8, 2011

(54) DIFFUSION PLATE AND DISPLAY APPARATUS HAVING THE SAME

(75) Inventors: Myung-Woon Lee, Seoul (KR); Jung-Wook Paek, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 278 days.

(21) Appl. No.: 12/430,517

(22) Filed: Apr. 27, 2009

(65) Prior Publication Data

US 2010/0124043 A1    May 20, 2010

(30) Foreign Application Priority Data

Nov. 19, 2008  (KR) .................. 10-2008-0115203

(51) Int. Cl.
G02B 13/20 (2006.01)
(52) U.S. Cl. .......... 362/619; 362/330; 359/599
(58) Field of Classification Search .......... 362/607, 362/619, 330, 331, 97.1–97.4; 359/599, 359/619; 349/64
See application file for complete search history.

(56) References Cited

U.S. PATENT DOCUMENTS

| | | | | |
|---|---|---|---|---|
| 7,338,184 B2* | 3/2008 | Chen et al. | ............ | 362/246 |
| 7,510,308 B2* | 3/2009 | Goto | ............ | 362/330 |
| 7,665,859 B2* | 2/2010 | Lim | ............ | 362/97.3 |
| 7,722,240 B2* | 5/2010 | Kodama et al. | ............ | 362/619 |
| 7,726,826 B2* | 6/2010 | Kusano et al. | ............ | 362/97.1 |
| 7,766,528 B2* | 8/2010 | Epstein et al. | ............ | 362/609 |
| 2009/0122229 A1* | 5/2009 | Kim et al. | ............ | 349/65 |
| 2009/0168421 A1* | 7/2009 | Ha et al. | ............ | 362/245 |

FOREIGN PATENT DOCUMENTS

| | | |
|---|---|---|
| JP | 2007-286261 | 1/2007 |
| KR | 1020040003713 | 1/2004 |
| KR | 10-0728262 | 6/2007 |
| KR | 10-2008-0064955 | 7/2008 |

OTHER PUBLICATIONS

English Abstract for Publication No. 1020040003713.
English Abstract for Publication No. 1020060045673 (for 10-0728262).
English Abstract for Publication No. 2007-286261.
English Abstract for Publication No. 1020080064955.

* cited by examiner

Primary Examiner — Jong-Suk (James) Lee
Assistant Examiner — Peggy A. Neils
(74) Attorney, Agent, or Firm — F.Chau & Associates, LLC

(57) ABSTRACT

Disclosed are a diffusion plate and a display apparatus having the same. The diffusion plate includes a base and a plurality of convex portions. The base includes a front surface and a rear surface. Each convex portion has a crescent of an ellipse formed on a front surface of the base while extending in one direction. The display apparatus includes a display panel, a light source, and the diffusion plate.

15 Claims, 7 Drawing Sheets

DIFFUSION PLATE AND DISPLAY APPARATUS HAVING THE SAME

CROSS-REFERENCE TO RELATED APPLICATION

This application relies for priority upon Korean Patent Application No. 2008-115203 filed on Nov. 19, 2008, the contents of which are herein incorporated by reference in their entirety.

BACKGROUND OF THE INVENTION

1. Field of the Invention

The present disclosure is directed to a diffusion plate and a display apparatus having the same. More particularly, this disclosure is directed to a diffusion plate provided with crescent shape convex portions and a display apparatus having the same.

2. Description of the Related Art

With the development of digital technology, driving mechanisms of display apparatuses have changed from analog to digital. These changes occur naturally due to consumer demand for lightweight display apparatuses, and high definition and clear images.

In response to these demands, the liquid crystal display has developed as a slim image display apparatus having high resolution. However, to further expand the market for liquid crystal displays, many vendors have attempted to develop products having low power consumption and low manufacturing cost.

A liquid crystal display comprises a liquid crystal panel and a backlight unit. The liquid crystal panel serves as a light receiving element. The backlight unit serves as a light source to provide light to the liquid crystal panel. In particular, the backlight unit typically includes a light source, which is provided in the form of a linear light source or a point light source, and an optical sheet, which allows light emitted from the light source to pass therethrough. The optical sheet converts light from linear or point light sources into surface light and increases light brightness.

Currently, slim display apparatuses with low power consumption and a low manufacturing cost are desired. However, there are challenges to making a liquid crystal display slimmer due to the geometrical structure of the backlight unit. In addition, for a low power consumption display apparatus, a more appealing external appearance may be obtained by using fewer lamps.

SUMMARY OF THE INVENTION

Embodiments of the present invention provide a diffusion plate which diffuses light uniformly even though light sources are widely spaced.

Embodiments of the present invention provide an ultra-slim display apparatus capable of realizing low power consumption and low manufacturing cost.

In one aspect of the present invention, a display apparatus includes a display panel, a plurality of light sources and a diffusion plate. The light sources are provided below the display panel to emit light. The diffusion plate is provided between the display panel and the light sources to diffuse the light. A plurality of diffusion sheets may be further provided between the display panel and the diffusion plate.

The diffusion plate includes a base and a plurality of convex portions. The base has a front surface and a rear surface. The convex portions are formed on the front surface of the base. The convex portions may be integrally formed with the base. The convex portions may extend in one direction.

A sectional surface of each convex portion is a crescent of an ellipse when the sectional surface is perpendicular to the front surface of the base. The crescent consists of an arc and a chord linking both ends of the arc. A ratio of a major axis to a minor axis of the ellipse is from about 2.6 to about 3.3. A ratio of a distance between two adjacent light sources and a distance between the diffusion plate and one of the light sources is larger than or equal to about 2.0.

When a length from the front surface of the base to a vertex of each convex portion is h and a length of the chord of the ellipse is p, equation $$h = \frac{1}{2} p \cdot \tan\theta$$

is satisfied. The $\theta$ is about 41° to about 45°. The arc may have a length of 300 μm or less.

The display panel may have a rectangular shape, a diagonal line of the display panel may have a length of about 32 inches, and eight cold cathode fluorescent lamps may be used as the light sources.

A distance between two adjacent light sources may be about 40 mm to about 50 mm and the distance between one of the light sources and the diffusion plate may be about 17 mm to about 20 mm.

A reflective plate may be provided below the light sources to reflect the light from the light sources toward the display panel. A distance between one of the light sources and the reflective plate may be about 4 mm to about 5 mm.

Each light source may be one of a cold cathode fluorescent lamp, an external electrode fluorescent lamp, a hot cathode fluorescent lamp and a light emitting diode.

The diffusion plate may include a material selected from the group comprising polycarbonate, polystyrene, polymethylmethacrylate, and methacrylate styrene.

According to an embodiment of the present invention, a diffusion plate may diffuse light more uniformly even though the distance between light sources is increased. By using such a diffusion plate, the number of light sources can be reduced and optical sheets can be omitted to enhance economic efficiency.

Accordingly, an embodiment of the present invention can provide a high quality display apparatus having improved light efficiency.

DETAILED DESCRIPTION OF EXEMPLARY EMBODIMENTS

Figure 1:
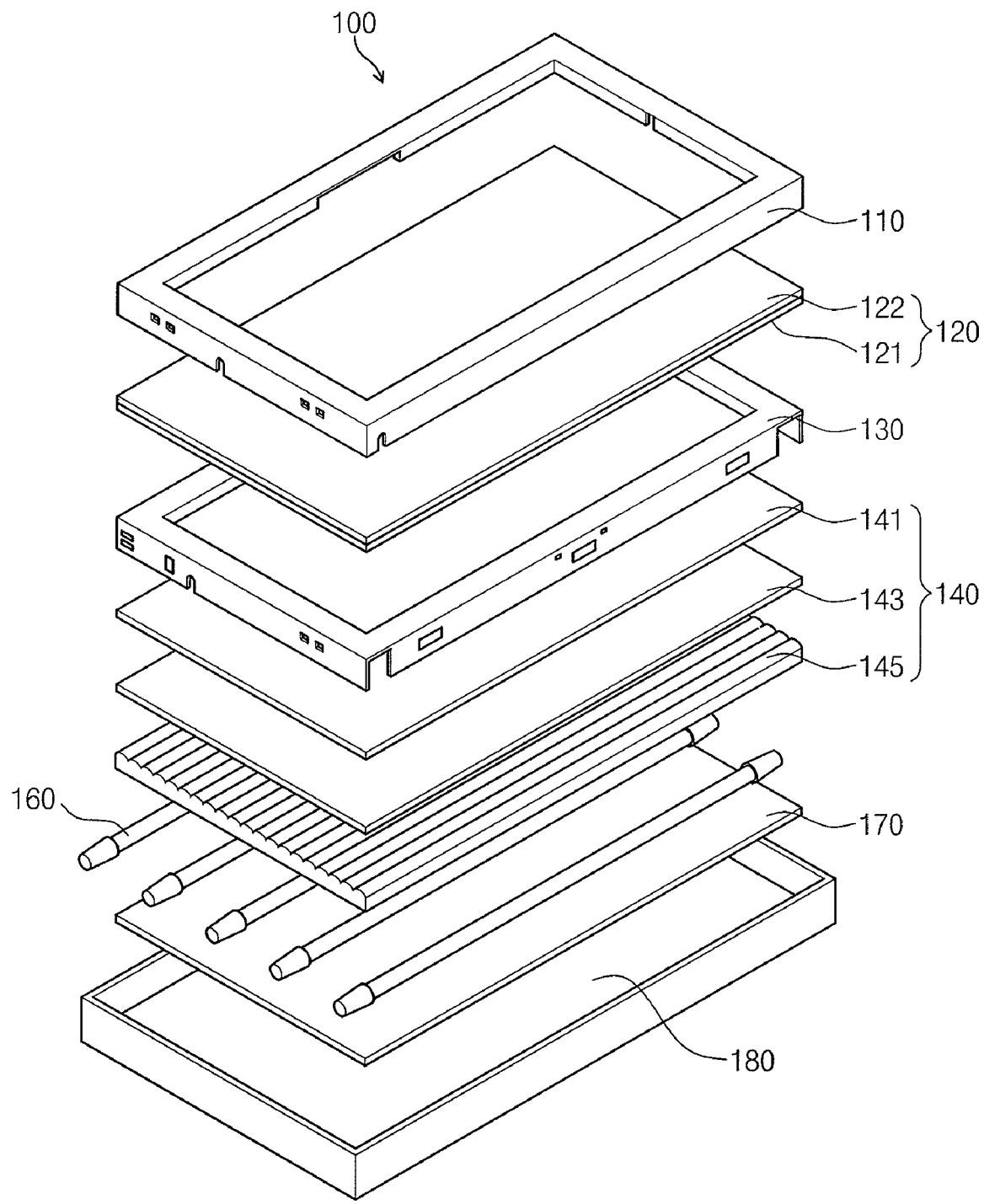
FIG. 1 is an exploded perspective view showing a liquid crystal display according to an embodiment of the present invention.

Hereinafter, a display apparatus according to an embodiment of the present invention will be described with reference to the accompanying drawings. In the following description, a liquid crystal display will be described as one example of the display apparatus. Although the present invention is described in that the liquid crystal display employs a cold cathode fluorescence lamp (CCFL) as a light source according to one embodiment, the present invention is not limited thereto, various lamps may be employed as the light source. In addition, the light source is a direct-type light source placed below a display panel according to one embodiment, the present invention is not limited thereto, the present invention is also applicable to an edge-type light source placed at one side of a lower portion of the display panel.

It should be understood that the present invention is not limited to the embodiments depicted in the appended drawings but includes all modifications, equivalents and alternatives within the spirit and scope of the present invention as defined in the following claims. In addition, the same reference numerals are used to designate the same elements throughout the drawings.

FIG. 1 is an exploded perspective view showing a liquid crystal display 100 according to an embodiment of the present invention.

Referring to FIG. 1, a liquid crystal display 100 according to an embodiment of the present invention includes a display panel 120 displaying an image on the front thereof.

A mold frame 130 is provided at an edge of the display panel 120 to support the display panel 120. An optical sheet unit 140 is provided at a lower portion of the mold frame 130, that is, a rear portion of the optical sheet unit 120. A light source 160 is provided at the lower portion of the optical sheet unit 140, that is, the rear portion of the optical sheet unit 140 or a side surface of the optical sheet unit 140 to supply light to the display panel 120 through the optical sheet unit 140.

An element supplying light to the display panel 120 as described above is referred to as a backlight unit, and the backlight unit includes the light source 160 and the optical sheet unit 140.

A liquid crystal display according to an embodiment of the present embodiment employs a direct-type backlight unit in which the light source 160 is placed at the rear portion of the optical sheet unit 140.

A reflective sheet 170 is provided below the light source 160 to reflect light not directed to the display panel 120 toward the display panel 120.

The reflective sheet 170 is provided at a lower portion thereof with a lower cover 180. The lower cover 180 receives the display panel 120, the optical sheet unit 140, the light source 160, and the reflective sheet 170 by assembling them. An upper cover 110 is provided that couples with the lower cover 180. The upper cover 110 supports edges on the front surface of the display panel 120. The upper cover 110 includes a display window to expose a display region of the display panel 120. The upper cover 110 is provided with, at a side surface thereof, a coupling unit such as a screw hole (not shown) to couple with the lower cover 180.

Although not shown, the display panel 120 may be provided with, at one side thereof, a printed circuit board connected with thin film transistors of the display panel 120. Signals generated from the printed circuit board are transmitted to the thin film transistors through interconnections. The thin film transistors apply voltages to pixels according to the signals, thereby driving the liquid crystals.

The display panels may include a liquid crystal display panel or an electrophoretic display panel. Embodiments of the present invention are not limited thereto, as any display panel capable of displaying an image may be employed. An exemplary, non-limiting, liquid crystal display panel according to an embodiment of the present invention, will be described below.

The display panel 120 has a rectangular plate with long lateral sides and short lateral sides. The display panel 120 includes a first substrate 121, a second substrate 122 facing the first substrate 121, and a liquid crystal layer (not shown) between the first substrate 121 and the second substrate 122. The display panel 120 drives the liquid crystal layer to display an image on the front of the display panel 120. In order to drive the liquid crystal layer, thin film transistors may be formed on the first substrate 121, and color filters may be formed on the second substrate 122. In this case, the first substrate 121 and the second substrate 122 may be referred to as a thin film transistor substrate and a color filter substrate, respectively. In addition, the first and second substrates 121 and 122 are provided at rear surfaces thereof with polarizing plates 120a and 120b, respectively, to adjust light transmittance according to alignment of the liquid crystal.

The display panel 120 may have various sizes. For example, the size of the display panel 120 may be about 32 inches, about 40 inches or more based on the length of a diagonal line of the display panel 120. Although an embodiment of the invention having a 32-inch display panel is described below, other embodiments of the present invention are not limited thereto, and may include different size display panels.

Since the liquid crystal layer is a non-emissive element, the light source 160 is supplied for displaying an image. Transmission light emitted from the light source 160 includes all polarization directions, not all of which are transmitted through the liquid crystal layer. In order to adjust the polarization direction of the transmission light to the liquid crystal layer, polarizing plates (not shown) are attached to both sides of the display panel 120 such that transmission axes cross each other at an angle of 90°. The polarizing plate polarizes the light that has passed through the liquid crystal such that the light is changed into light having a specific polarization direction. Accordingly, when the light passes through the display panel 120, the intensity of the transmission light is adjusted according to a rotation degree of a polarizing axis, so that a display intensity of the display panel can range from black to white.

The mold frame 130 is provided along the edges of the display panel 120. The mold frame 130 is shaped as a substantially rectangular ring. The mold frame 130 supports the display panel 120 and the optical sheet unit 140. The mold frame 130 is assembled with the lower cover 180 to receive the optical sheet unit 140, the light source 160, and the reflective sheet 170. As shown in FIG. 1, a single mold frame 130 may be provided. However, in other embodiments of the invention, a plurality of mold frames 130 may be provided and assembled with each other.

The optical sheet unit 140 adjusts light emitted from the light source 160. The optical sheet unit 140 includes a diffusion plate 145 placed below the display panel 120. The optical sheet unit 140 may further include a protective sheet 141 and a prism sheet 143 in addition to the diffusion plate 145. Although not shown, the optical sheet unit 140 may further include a diffusion sheet.

The diffusion plate 145 may include a transparent polymer resin such as polycarbonate, polystyrene, polymethylmethacrylate, or methacrylate styrene. The diffusion plate 145 diffuses light emitted from the light source 160 to supply the light to the display panel 120, and details thereof will be described below.

In other embodiments of the invention, a plurality of optical sheet units 140 may be employed. In addition, two or three optical sheet units 140 may be overlapped with each other in use. In addition, in other embodiments of the invention, the protective sheet 141 or the prism sheet 143 may be omitted.

The prism sheet 143 collects light diffused by the diffusion plate 145 to transmit the light perpendicular to a plane of the display panel 120 to achieve a more uniform brightness distribution.

The protective sheet 141, which is placed at the uppermost portion of the optical sheet unit 140, protects the prism sheet 143 from scratching.

A plurality of light sources 160 are provided below the optical sheet unit 140 to supply light to the display panel 120 through the optical sheet unit 140. The light sources 160 may include a cold cathode fluorescence lamp (CCFL), an external electrode fluorescent lamp (EEFL), a hot cathode fluorescence lamp (HCFL), or a light emitting diode (LED).

The reflective sheet 170 is provided below the light sources 160. The reflective sheet 170 reflects light emitted downward from the light sources 160 toward the display panel 120.

As described above, when the display panel 120 is a non-emissive type liquid crystal display panel, the display panel 120 employs the light sources 160 to supply light. According to various embodiments of the invention, the light sources 160 may include linear lamps such as CCFLs or point light sources such as LEDs to supply light.

As described above, the light sources 160 are typically linear light sources or point light sources. Accordingly, if light emitted from the light sources 160 is directly transmitted to the display panel 120 without passing through any intervening elements, the display panel 120 may have dark portions and bright portions according to the light intensity, reducing image quality. Accordingly, the light path from the light sources 160 may be changed to increase light efficiency. This function is performed by the optical sheet unit 140. In particular, the diffusion plate 145 of the optical sheet unit 140 diffuses light output from a linear light source or a point light source. The diffusion plate diffuses into multiple directions light emitted by the light sources in a specific direction.

In a display apparatus according to an embodiment of the invention, the number of light sources may be reduced, thereby reducing power consumption and the manufacturing cost and allowing a slimmer display apparatus. For example, a conventional display apparatus requires 12 light sources (e.g., CCFLs) for a 32-inch display panel. However, the 12 light sources limit the slimness of a display apparatus. Accordingly, according to an embodiment of the invention, a display apparatus may employ fewer light sources, for example, eight CCFLs. Therefore, a 32-inch display panel employing eight CCFLs will be described below as an exemplary, non-limiting embodiment. The eight CCFLs are uniformly spaced below the display panel 120 in parallel to one of the lateral sides of the display panel 120.

However, if the number of lamps is reduced in a display apparatus having the same size as a conventional display apparatus, a distance between light sources increases, degrading the uniformity of light. If a conventional scattering diffusion plate is used to compensate for the increased distance between the light sources, the display apparatus becomes thicker rather than thinner. Accordingly, instead of the scattering diffusion plate, a diffusion plate capable of adjusting the path and an amount of light output from fewer light sources is desired.

A conventional diffusion plate includes a transparent polymer plate in which small beads are uniformly distributed. To ensure reliability, the diffusion plate may have doubled or tripled layers. In the above structure, the beads are a main factor diffusing light, and a light transmittance and diffusion rate of the diffusion plate are determined according to the density of beads contained in the diffusion plate. When such a scattering diffusion plate is used, a ratio of a distance between light sources to a distance between the light sources and the diffusion plate is as follows:

$$\frac{\text{distance between light sources}}{\text{distance between light source and diffusion plate}} < 1.7.$$

This ratio is experimentally obtained to adjust an irregular light intensity distribution caused by a sporadic distribution of the light sources to the uniform light intensity distribution suitable for the display apparatus.

Accordingly, if fewer light sources are employed so that the distance between the light sources becomes greater than 1.7, the quality of the display panel 120 cannot be ensured only by using a typical diffusion plate, and an additional diffusion plate is required, preventing a slimmer display apparatus.

Therefore, an embodiment of the present invention provides a diffusion plate capable of outputting more light where the light intensity is insufficient and outputting less light in a region having a sufficient light intensity by refracting light in the diffusion plate, instead of randomly scattering light to achieve a uniform output intensity distribution.

Figure 2:
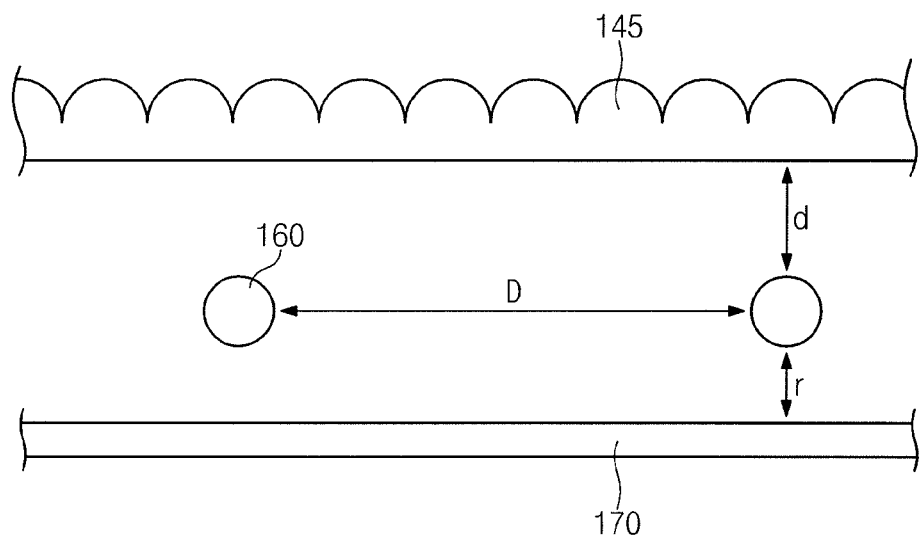
FIG. 2 is a sectional view showing an arrangement of a diffusion plate and light sources according to an embodiment of the present invention.
Figure 3:
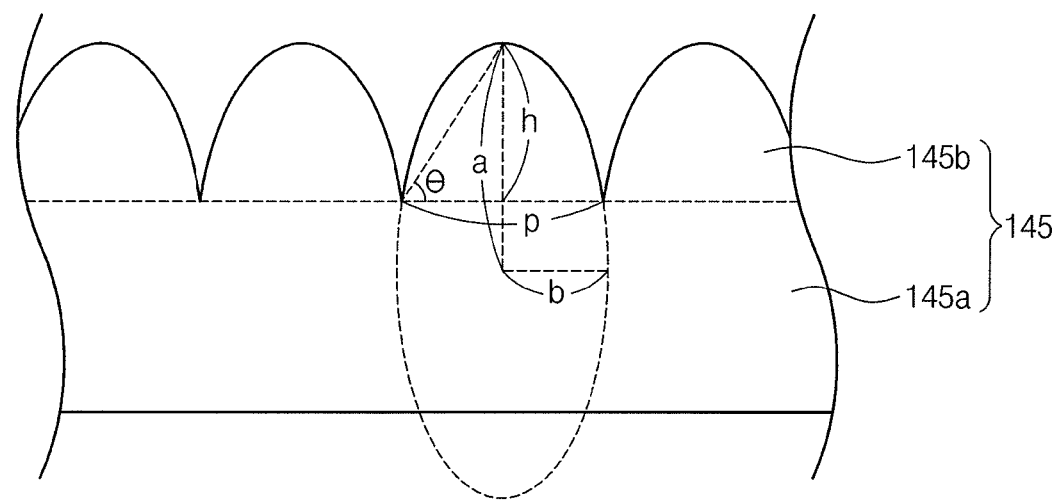
FIG. 3 is a sectional view showing a portion of the diffusion plate of FIG. 2.
Figure 4A:
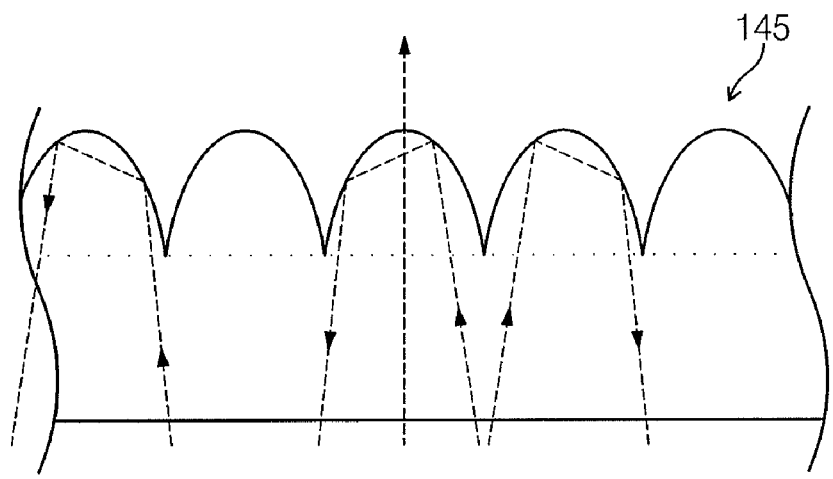
FIGS. 4A and 4B are views showing a path of light introduced into the diffusion plate in FIG. 3.
Figure 4B:
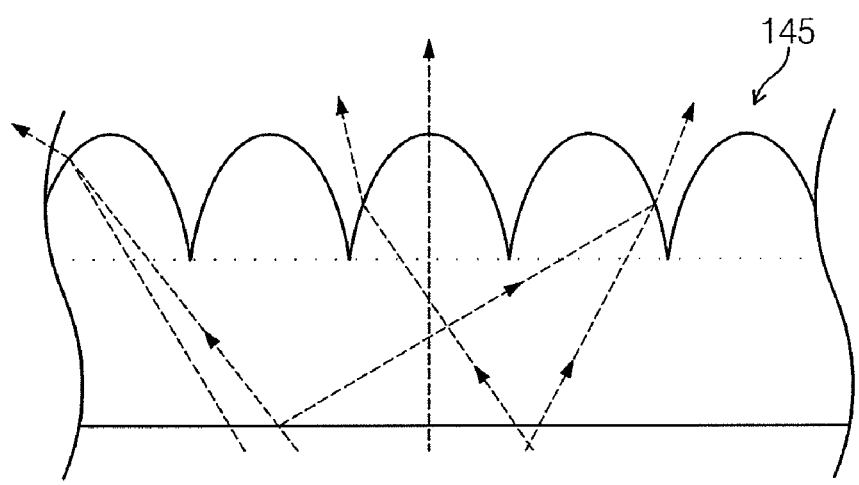

FIG. 2 is a sectional view showing the arrangement of a diffusion plate 145 and light sources 160 according to an embodiment of the present invention. FIG. 3 is a view showing a portion of a sectional surface of the diffusion plate 145. FIGS. 4A to 4B are views showing a travel path of light incident onto the diffusion plate 145 of FIG. 3.

As shown in drawings, a diffusion plate 145 according to an embodiment of the present invention includes a base 145*a* having a front surface and a rear surface facing the front surface.

A plurality of convex portions 145*b* are formed on the front surface of the base 145*a*. As shown in FIG. 2, the convex portions may be integrally formed with the base 145*a*. The convex portions 145*b* may extend in a direction parallel to one side of the base 145*a*.

A sectional surface of each convex portion 145*b*, which is perpendicular to the front surface of the base 145*a*, has a shape of a crescent or a segment of an ellipse. The crescent is a portion of an ellipse, and includes an arc and a chord linking both ends of the arc. Referring to FIGS. 4A and 4B, most incident light incident that is substantially perpendicular to the rear surface of the base 145*a* is totally reflected in a diffusion plate 145 having the above structure, and light incident at a predetermined angle with respect to the rear surface of the base 145a is output through the front surface of the diffusion plate 145 through reflection and refraction.

Light incident onto the diffusion plate 145 has a greatest intensity at a region above the light sources 160, and the least intensity at a region between the light sources 160. As described above, a diffusion plate 145 according to an embodiment of the present invention reflects most light received from an upper portion of the light sources 160, where the light is more intense and is substantially perpendicular to the rear surface of the base 145a. The diffusion plate 145 outputs through the front surface of the base most light received from regions spaced apart from the light sources 160, where the light is less intense and is incident at a predetermined angle with respect to the rear surface of the base 145a. Accordingly, light incident perpendicular to the rear surface of the diffusion plate 145 and directly output above the light sources 160, is reduced, to obtain a substantially uniform intensity distribution of light output from the diffusion plate 145.

Referring to FIGS. 2 and 3, the crescent is a part of the ellipse which has a major axis (a) and a minor axis (b). According to an embodiment of the invention, the ratio (a/b) of the major axis to the minor axis is in the range of about 2.6 to about 3.3. According to this embodiment, the minor axis is parallel to the front surface of the base, and the major axis is perpendicular to the minor axis and the front surface of the base.

A length (h) between the front surface of the base and a vertex of each convex portion parallel with the major axis can be obtained through the following equation 1.

$$h = \frac{1}{2} p \cdot \tan\theta, \quad (1)$$

where p refers to a length of the chord of the ellipse.

According to an embodiment of the invention, an angle ($\theta$) determining the length (h) may be in the range of about 41° to about 45°.

Figure 5:
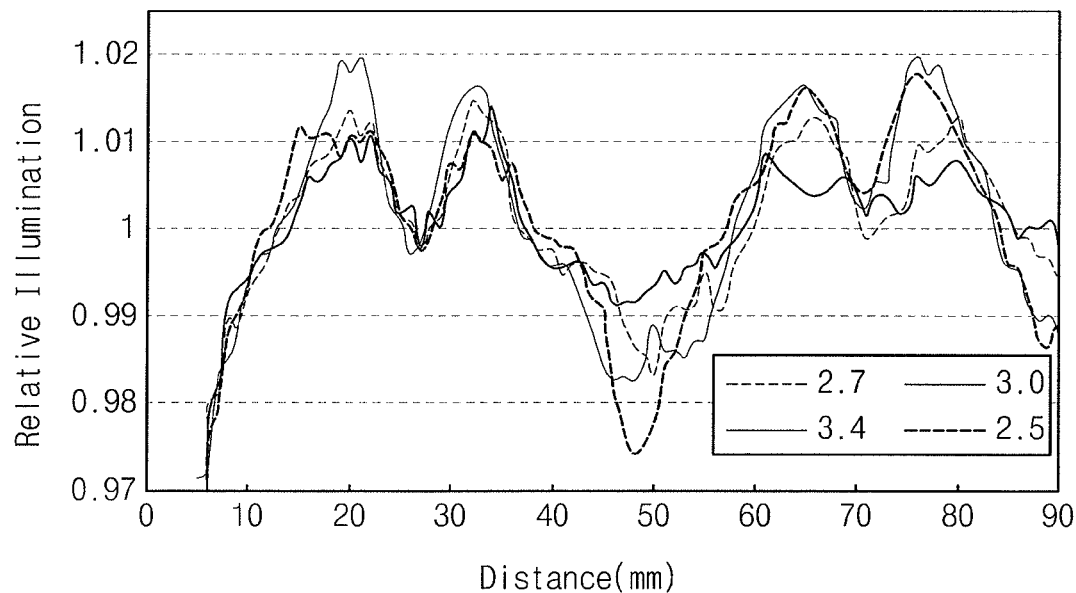
FIG. 5 is a graph showing surface illumination as a function of a/b in a liquid crystal display including a diffusion plate according to an embodiment of the present invention.
Figure 6:
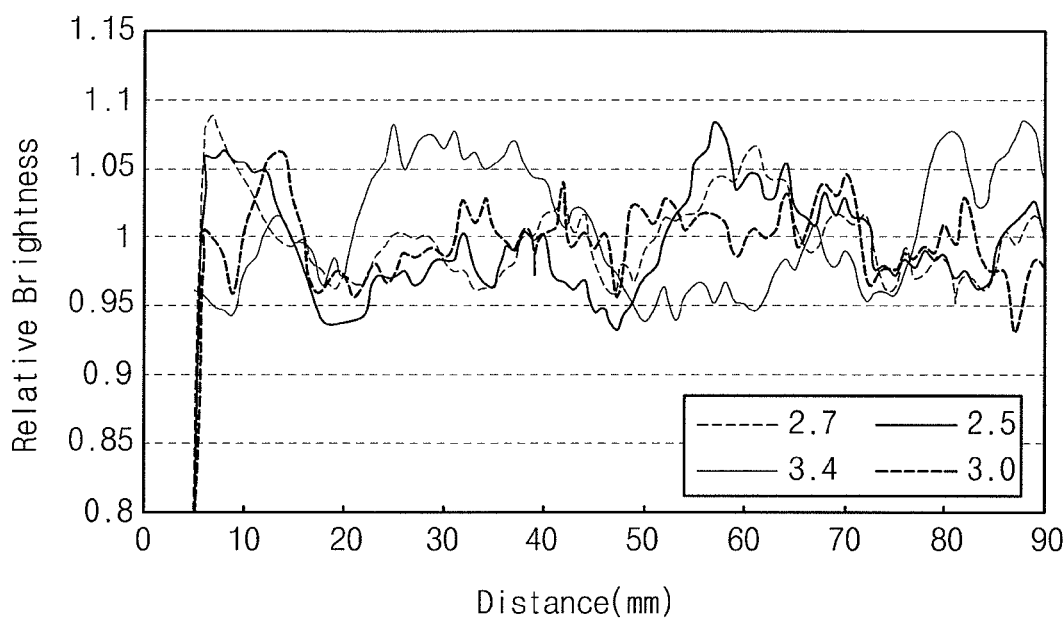
FIG. 6 is a graph showing brightness as a function of a/b in a liquid crystal display including the diffusion plate according to an embodiment of the present invention.

FIG. 5 is a graph showing surface illumination as a function of distance for a plurality of ratios (a/b) in a liquid crystal display including the diffusion plate 145 according to an embodiment of the present invention. FIG. 6 is a graph showing brightness for a plurality of ratios (a/b) as a function of distance in a liquid crystal display including the diffusion plate 145 according to an embodiment of the present invention. According to an embodiment of the invention, the angle ($\theta$) of the diffusion plate 145 is fixed to about 40°, and the value of the ratio (a/b) is about 2.5, about 2.7, about 3.0, and about 3.4.

In the graphs of FIGS. 5 and 6, the horizontal axes represent a distance between two adjacent light sources 160 in mm. The vertical axes of the graphs shown in FIGS. 5 and 6 represent relative values of illumination and brightness as a function of distance, respectively, when the average values of the illumination and the brightness are 1, respectively.

Referring to FIGS. 5 and 6, as the ratio (a/b) corresponding to curvature of a lens is changed when the angle ($\theta$) is fixed to about 40°, light, which is perpendicularly output upward from each light source 160, can be increasingly reused. Accordingly, a darker portion above each light source 160 is expanded, and an amount of light between the light sources 160 is increased. In other words, if the ratio (a/b) of the major axis (a) to the minor axis (b) becomes greater than 3.3, an upper portion of each convex portion is sharpened similar to that of a prism. Accordingly, light incident perpendicular to the rear surface of the diffusion plate 145 is substantially totally reflected, so that light emitted upward perpendicular to the front surface of the diffusion plate 145 is significantly reduced. Accordingly, a dark line may occur above each light source 160.

On the contrary, if the ratio (a/b) of the major axis (a) to the minor axis (b) becomes smaller than 2.6, a diffusive effect is reduced, so that a bright portion may occur above each light source 160.

Figure 7:
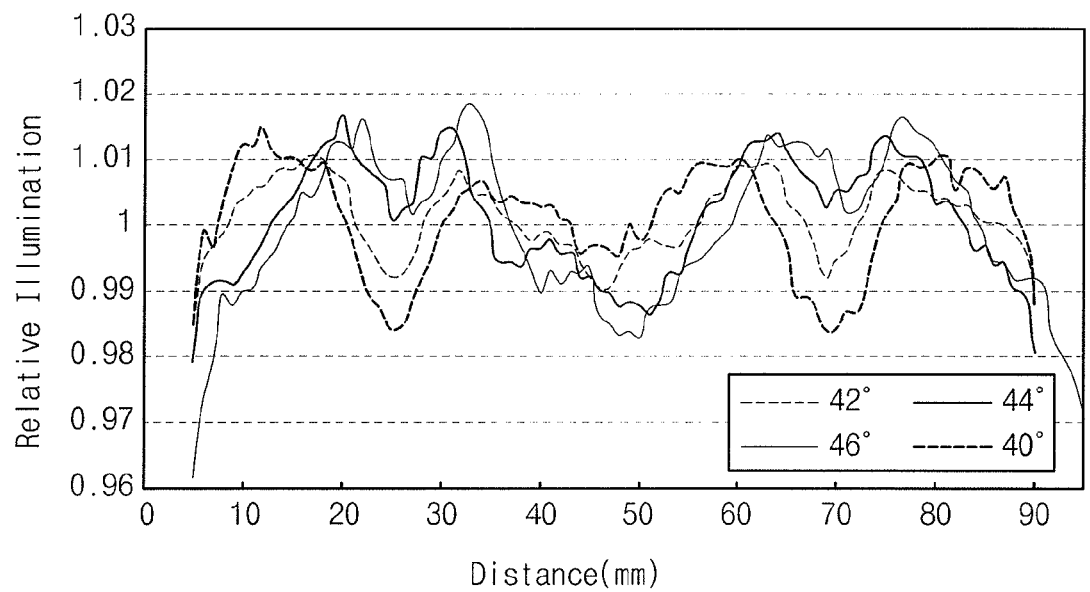
FIG. 7 is a graph showing surface illumination as a function of an angle (θ) in a liquid crystal display including a diffusion plate according to an embodiment of present invention.
Figure 8:
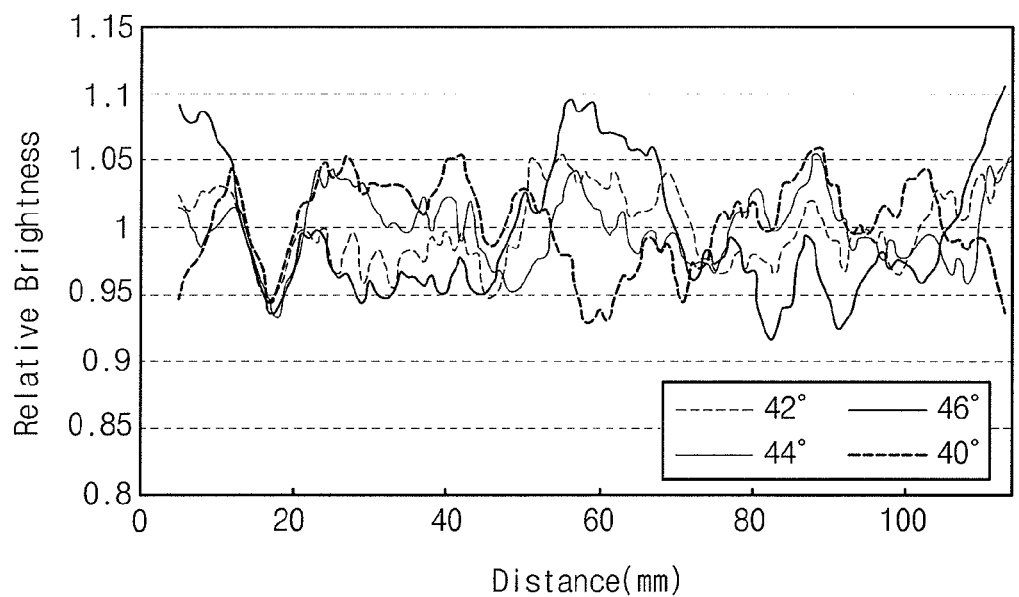
FIG. 8 is a graph showing brightness as a function of an angle (θ) in a liquid crystal display including a diffusion plate according to an embodiment of the present invention.

FIG. 7 is a graph showing a surface illumination as a function of distance for a plurality of angles ($\theta$) in the liquid crystal display including the diffusion plate 145 according to an embodiment of the present invention. FIG. 8 is a graph showing brightness as a function of distance for a plurality of angles ($\theta$) in the liquid crystal display including the diffusion plate 145 according to an embodiment of the present invention. According to an embodiment of the invention, the ratio (a/b) is fixed to about 3.0, and the angle ($\theta$) is about 40°, about 42°, about 44°, and about 46°.

In the graphs of FIGS. 7 and 8, the horizontal axes represent a distance between two adjacent light sources 160 in mm. The vertical axes of the graphs shown in FIGS. 7 and 8 represent relative values of illumination and brightness as a function of distance, respectively, when the average values of the illumination and the brightness are 1, respectively.

Referring to FIGS. 7 and 8, if the angle ($\theta$) determining the height of the ellipse is greater than 45°, the height of each convex portion is increased, so that the shape of each convex portion approximates a half-elliptical shape. Accordingly, the transmittance of light perpendicular to the front surface of the base is reduced, so that a dark portion may occur above each light source 160.

On the contrary, if the angle ($\theta$) is smaller than 41°, the height of each convex portion is decreased, so that each convex portion has a substantially flat crescent. The transmittance of light substantially perpendicular to the front surface of the base increases as compared with a case in which the angle ($\theta$) is 41°, so that light diffusion is reduced. Accordingly, a bright portion may occur above each light source 160.

The length of the chord may be referred to as a pitch since the length of the chord may be a period in which the same pattern is repeated. The pitch is set such that a moiré phenomenon can be minimized. The moiré phenomenon occurs when there are two patterns having different periods, due to the interference light subject to the patterns. Such the moiré phenomenon may be recognized by a person due to the generation of light having a period greater than that of an original pattern by interference of the two patterns. Accordingly, if the light having the period greater than that of the original pattern is not generated, the moiré phenomenon can be minimized.

In the display apparatus, elements having a periodic property include the display panel 120, the prism sheet 143 having prisms, and the diffusion plate 145 having patterns according to an embodiment of the present invention. Since the components are used in the display apparatus in the form of the assembly of the display panel 120 and the diffusion plate 145, or the assembly of the display panel 120, the prism sheet 143, and the diffusion plate 145, a pitch of each component is calculated to obtain a pitch sufficient to prevent the moiré phenomenon. Accordingly, the pitch may be varied according to a pitch of the prism sheet 143 or the display panel 120.

Figure 9A:
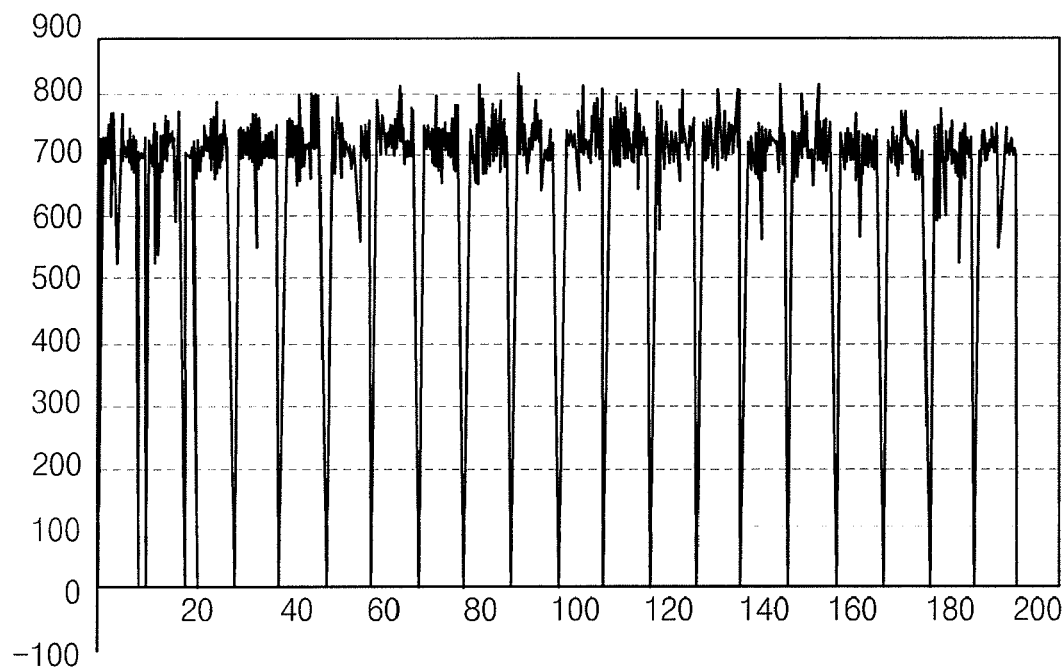
FIGS. 9A to 9C are graphs showing a relative intensity of output light as a function of a pitch of a diffusion plate having a pattern according to an embodiment of the present invention when a display panel and a prism sheet have a uniform pitch.
Figure 9B:
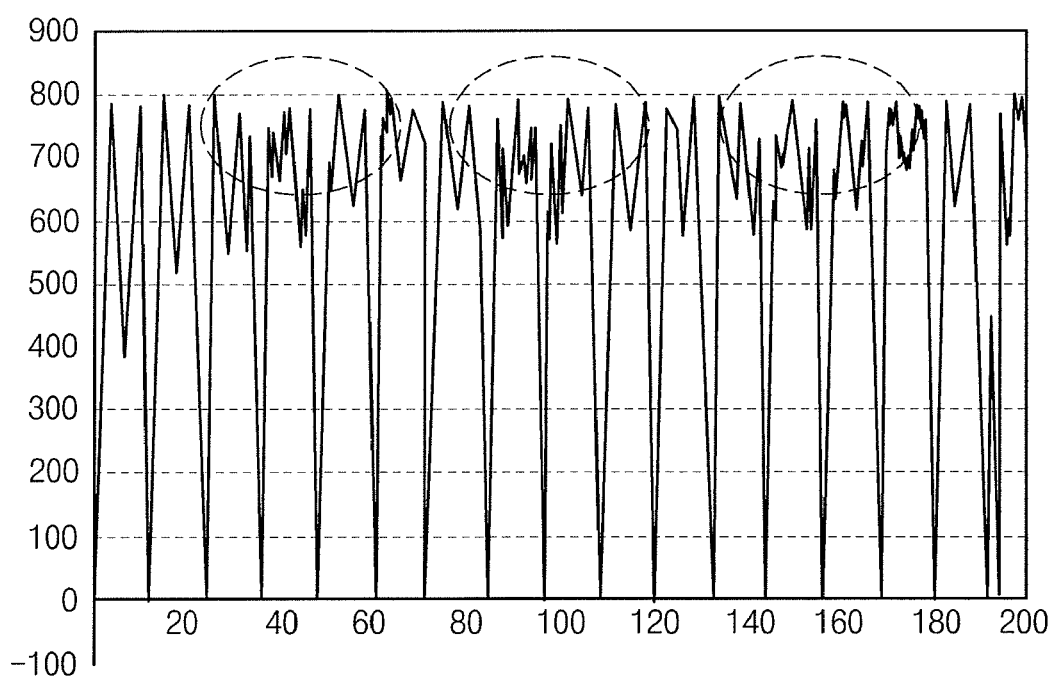
Figure 9C:
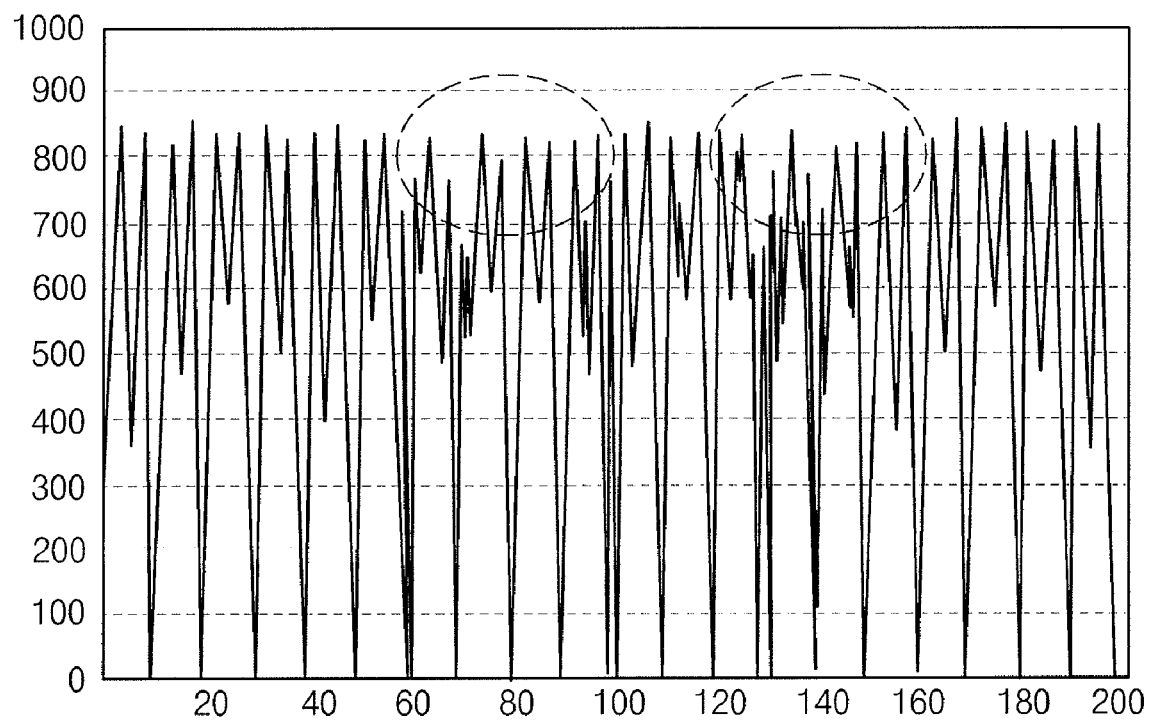

FIGS. 9A to 9C are graphs showing the relative intensity of light output as a function of a pitch of the diffusion plate 145 having patterns according to the present invention when the display panel 120 and the prism sheet 143 have uniform pitches. Horizontal axes of the graphs represent a distance from a predetermined point to each the light source 160 in mm, and vertical axes of the graphs represent the relative intensity of the light.

A display panel 120 according to an embodiment of the invention has 32 inches. A pitch of pixels in the display panel 120 is about 170 μm, and a pitch of prisms in the prism sheet 143 is about 180 μm. A pitch of the diffusion plate 145 patterned according to an embodiment of the present invention is about 160 μm in FIG. 9A, about 200 μm in FIG. 9B, and about 250 μm in FIG. 9C.

As shown in FIGS. 9A to 9C, when the pitch of the diffusion plate 145 according to an embodiment of the present invention is about 160 μm, the moiré phenomenon cannot be found. However, when the pitch is about 200 μm or about 250 μm, the moiré phenomenon can be found in portions marked by dotted lines.

As recognized from the above experimental result, since a pitch of each pixel in the display panel 120 is in the range of about 300 μm to about 600 μm, and a pitch of the prism sheet 143 is in the range of about 50 μm to about 250 μm, the pitch of the diffusion plate 145 is less than or equal to about 300 μm according to an embodiment of the present invention. In particular, the moiré phenomenon is minimized when the pitch of the diffusion plate 145 is in the range of about 150 μm to about 170 μm. If the pitch of the diffusion plate 145 is greater than about 300 μm, the moiré phenomenon may occur, and as the pitch of the diffusion plate 145 increases, dark and bright portions may become visible. On the contrary, the pitch of the diffusion plate 145 may be less than about 150 μm. However, if the pitch is less than or equal to about 50 μm, manufacturing the diffusion plate 145 becomes more challenging, and the manufacturing cost of the diffusion plate 145 may increase. However, the pitch of a diffusion plate 145 is not limited to a specific range.

The diffusion plate 145 has a thickness of between about 0.5 mm to about 2.0 mm. If the diffusion plate 145 is thinner than the above values, the diffusion late 145 may be easily broken. If the diffusion plate 145 is thicker than the above values, forming the convex portions becomes more challenging, lowering productivity.

The diffusion plate 145 may be formed through various schemes, and the scheme of manufacturing the diffusion plate 145 is not limited. For example, the diffusion plate 145 may be formed through extrusion molding, injection molding, or UV curing.

As shown in FIG. 1, the diffusion plate 145 is provided between the display panel 120 and the light sources 160 to supply light to the display panel 120 while increasing the efficiency of light output from the light sources 160.

Referring to FIG. 2 again, according to an embodiment of the present invention, when the diffusion plate 120 is employed, a ratio (D/d) of a distance (D) between two adjacent light sources 160 to a distance (d) between one of the light sources 160 and the diffusion plate 145 can be greater than or equal to about 2.0. When a conventional diffusion plate is used, a distance between light sources must be minimized, and a distance between the light sources and the diffusion plate must be maximized in order to prevent the deviation of light intensity from being visible. Therefore, generally, the ratio of the distance between two adjacent light sources to the distance between one of the light sources and the diffusion plate is smaller than 1.7.

However, according to an embodiment of the present invention, by using a light diffusion function of the diffusion plate 145, the distance (D) between two adjacent light sources 160 can be increased, and the distance (d) between one of the light sources 160 and the diffusion plate 145 can be reduced.

The distance (D) between two adjacent light sources 160 is in the range of about 40 mm to about 50 mm, and the distance (d) between one of the light sources 160 and the diffusion plate 145 is in the range of about 17 mm to about 20 mm.

In addition, a distance (r) between one of the light sources 160 and the reflective surface 170 provided below the light sources 160 to reflect light emitted from the light sources 160 to the display panel 120 can be reduced. The distance (r) between one of the light sources 160 and the reflective sheet 170 may be in the range of about 4 mm to about 5 mm.

As described above, according an embodiment of the present invention, the number of the light sources 120 can be significantly reduced, and the distance (d) between the light sources 120 and the diffusion plate 145 and the distance (r) between the light sources 120 and the reflective sheet 170 can be reduced, thereby achieving a slimmer display apparatus and reducing power consumption and manufacturing cost.

Although exemplary embodiments of the present invention have been described, it is understood that the present invention should not be limited to these exemplary embodiments and that various changes and modifications can be made by one ordinary skilled in the art within the spirit and scope of the present invention as hereinafter claimed.

What is claimed is:

1. A display apparatus comprising:
a display panel;
a plurality of light sources provided below the display panel to emit light; and
a diffusion plate provided between the display panel and the light sources to diffuse the light, the diffusion plate comprising a base having a front surface and a rear surface, and a plurality of convex portions on the front surface of the base,
wherein a sectional surface of each convex portion is a crescent of an ellipse,
wherein the sectional surface is perpendicular to the front surface,
a ratio of a major axis to a minor axis of the ellipse is from about 2.6 to about 3.3,
a ratio of a distance between two adjacent sources and a distance between one of the light sources and the diffusion plate is about 2.0 and more, and
when a length from the front surface of the base to a vertex of each convex portion is h and a length of the chord of the ellipse is p, equation $$h = \frac{1}{2} p \times \tan\theta$$

is satisfied, wherein θ is about 41° to about 45°.

2. The display apparatus of claim 1, wherein the convex portion are integrally formed with the base while extending in one direction.

3. The display apparatus of claim 1, wherein the chord has a length of about 50 μm to about 300 μm.

4. The display apparatus of claim 1, wherein the diffusion plate comprises a material selected from the group of consisting of polycarbonate, polystyrene, polymethylmethacrylate, and methacrylate styrene.

5. The display apparatus of claim 1, wherein the display panel has a rectangular shape, a diagonal line of the display panel has a length of about 32 inches, and eight cold cathode fluorescent lamps are used as the light sources.

6. The display apparatus of claim 5, wherein a distance between two adjacent light sources is about 40 mm to about 50 mm.

7. The display apparatus of claim 5, wherein the distance between one of the light sources and the diffusion plate is about 17 mm to about 20 mm.

8. The display apparatus of claim 1, further comprising a reflective plate under the light sources to reflect the light from the light sources toward the display panel.

9. The display apparatus of claim 8, wherein a distance between one of the light sources and the reflective plate is about 4 mm to about 5 mm.

10. The display apparatus of claim 1, further comprising a plurality of diffusion sheets provided between the display panel and the diffusion plate.

11. The display apparatus of claim 1, wherein each light source is one of a cold cathode fluorescent lamp, an external electrode fluorescent lamp, a hot cathode fluorescent lamp and a light emitting diode.

12. A diffusion plate comprising:
a base comprising a front surface and a rear surface opposite to the front surface; and
a plurality of convex portions formed on the front surface of the base,
wherein a sectional surface of each convex portion is a crescent of an ellipse,
wherein the sectional surface is perpendicular to the front surface,
a ratio of a major axis to a minor axis of the ellipse is from about 2.6 to about 3.3, and
when a length from the front surface of the base to a vertex of each convex portion is h, and a length of the chord of the ellipse is p, equation $$h = \frac{1}{2} p \times \tan\theta$$

is satisfied, wherein $\theta$ is about 41° to about 45°.

13. The diffusion plate of claim 12, wherein the convex portions are integrally formed with the base while extending in one direction.

14. The diffusion plate of claim 12, wherein the chord has a length of about 50 μm to about 300 μm.

15. The diffusion plate of claim 12, wherein the diffusion plate comprises a material selected from the group of consisting of polycarbonate, polystyrene, polymethylmethacrylate, and methacrylate styrene.

* * * * *